(12) United States Patent
Samu et al.

(10) Patent No.: US 6,405,212 B1
(45) Date of Patent: Jun. 11, 2002

(54) DATABASE SYSTEM EVENT TRIGGERS

(75) Inventors: Sriram Samu; Namit Jain; Wei Wang, all of Redwood Shores, CA (US)

(73) Assignee: Oracle Corporation, Redwood Shores, CA (US)

(*) Notice: Subject to any disclaimer, the term of this patent is extended or adjusted under 35 U.S.C. 154(b) by 0 days.

(21) Appl. No.: 09/405,013

(22) Filed: Sep. 27, 1999

(51) Int. Cl.$^7$ ................................................ G06F 17/30
(52) U.S. Cl. ........................ 707/103 R; 707/9; 707/10
(58) Field of Search ................................ 707/2, 9, 102, 707/10, 103 R; 705/39; 709/207, 225

(56) References Cited

U.S. PATENT DOCUMENTS

| | | | | |
|---|---|---|---|---|
| 5,862,325 A | * | 1/1999 | Reed et al. | 709/201 |
| 6,088,717 A | * | 7/2000 | Reed et al. | 709/201 |
| 6,108,664 A | * | 8/2000 | Nori et al. | 707/103 |
| 6,253,203 B1 | * | 6/2001 | O'Flaherty et al. | 707/9 |
| 6,275,824 B1 | * | 8/2001 | O'Flaherty et al. | 707/9 |
| 6,317,790 B1 | * | 11/2001 | Bowker et al. | 709/225 |

* cited by examiner

Primary Examiner—Diane D. Mizrahi
(74) Attorney, Agent, or Firm—Hickman Palermo Truong & Becker LLP; Brian D. Hickman (57) ABSTRACT

A technique for database management includes receiving an indication of a selected scope of a trigger. The scope is selected from a plurality of scopes of database management. The scope can be on the level of an individual table, or a schema associated with a user, or the database itself, or a system of databases, among others. The technique also includes receiving an indication of a selected event that belongs to the set of one or more events associated with the selected scope. Trigger metadata is stored that identifies both the selected scope and the selected event. A technique is also described for executing a process in this database management system. Flags indicative of one or more applicable events of the selectable events are loaded into a private cache of the process and checked when a new event occurs.

40 Claims, 8 Drawing Sheets

| STARTUP | SHUTDOWN | LOGON | LOGOFF | ERROR | CREATE | DROP | • • • |
|---------|----------|-------|--------|-------|--------|------|-------|
| 0 | 0 | 0 | 0 | 1 | 1 | 0 | • • |

DATABASE SYSTEM EVENT TRIGGERS

FIELD OF THE INVENTION

The present invention relates to database management systems, and more particularly, to database management systems in which selectable system events trigger programmable actions upon satisfaction of programmable conditions.

BACKGROUND OF THE INVENTION

Databases are organized arrangements of information on computer systems convenient for storing and retrieving information. Database management systems provide resources for conveniently creating, maintaining, deleting and protecting access to databases. In a relational database system a single database is made up of one or more related tables, each table having information arranged in rows and columns. Each column represents a kind of information and each row stores values for all the columns in the table.

Users interact with a database using a query language such as the Structure Query Language (SQL). SQL is a powerful non-procedural language which serves as the industry standard for relational database management systems. Data Manipulation Language (DML) statements are SQL statements that retrieve or manipulate data in tables. DML statements are the most frequently used SQL statements. Data Definition Language (DDL) statements are SQL statements that define, alter the structure of, and drop tables.

In a database management system, a trigger is an object that specifies a series of actions to be automatically performed when a specific event occurs. According to industry standards, DML statements are the events that cause user-defined triggers to be activated (or "fired"). For example, in a relational database, user-defined triggers may be designed to fire when a row of a database table or a table view is updated, inserted, or deleted. Accordingly, each user-defined trigger is typically associated with a single database table. That is, in a conventional database management system, the scope of the user-defined trigger is the table level of the database.

The series of actions specified by a trigger is typically written as instructions in a high-level database language such as SQL or PL/SQL (a procedural language extension of SQL available from Oracle Corporation of Redwood Shores, Calif.). In conformance with industry standards, these instructions must be able to access the data values of table columns corresponding to an affected row before the triggering DML statement was applied (the "old values") and after the modification was applied (the "new values").

Since triggers are objects, database customers can define, remove, and store triggers associated with a database table, and the database management system keeps track of which triggers have been defined for which table by storing that information as metadata (information about data) associated with the table in a data dictionary for the database. Consequently, triggers enable database customers to implement additional functionality in their databases for such purposes as enforcement of business rules and security.

Conventional trigger mechanisms can be wasteful of system resources. Specifically, triggers often include conditions. When a trigger is fired, the condition associated with the trigger is evaluated. If the condition is satisfied, then some specified action is performed. If the condition is not satisfied, then no action is performed. Thus, the number of times a trigger fires may be magnitudes greater than the number of times the action associated with the trigger actually has to be performed.

When the triggering event has occurred, substantial system resources are required to evaluate the condition. For example, to evaluate any allowed SQL condition, code encompassing about 20,000 instructions must be executed. This consumption of resources is exacerbated as the number of triggers associated with each event increases. For example, if a database has 1000 users, and each has defined 3 triggers for a "delete" operation on the same table, then 3000 triggers fire when a delete event occurs on that table, and 3000 conditions have to be evaluated, each requiring the execution of code with 20,000 instructions. This evaluation load is the same whether or not the conditions are satisfied. Thus it is possible to consume substantial resources just to conclude that few or no actions are to be executed.

Trigger conditions and actions are procedures typically stored with table metadata in a data dictionary within the database. Trigger events are confined to table and view level DML operations insert, update, delete. When a user defines a trigger, the user specifies the event name. The event name must be chosen from a short list of selectable events. The selectable events are INSERT, UPDATE and DELETE. The user must then specify the table name, e.g., EMPLOYEE if the employee table is to have the trigger. Then the user provides the condition as an SQL expression and the action as a stored procedure.

The trigger is then fired when the user executes an SQL statement that performs the selected DML operation on the specified table. When the table is referenced in an SQL statement as the result of a database tool or a user application process run at a later time by the same or a different user, the table metadata is loaded into memory, including a map of all the table triggers and events on which they fire. The trigger events are compared to the SQL statement to see if the trigger is applicable, i.e., if the SQL statement includes the DML operation that is the event for the trigger, e.g. the trigger is for INSERT and the SQL statement includes the INSERT operation for this table. If the trigger is applicable, then the condition and action statements are loaded into a cache in dynamic memory from disk, if not already there, compiled if necessary, and combined with the rest of the compiled SQL statement. Then when the compiled SQL statement is executed, the trigger condition is evaluated using the available old and/or new values on the row. If the condition is satisfied, the action is executed, again using the old or new values if needed.

There are many database system states and system operations for which the conventional system does not allow customers to define triggers. These states and operations can be important to the customer but have a scope beyond that of the table level. For example, a user of several databases may wish to respond to a particular database starting up. As another example, the owner of a table in a database may want to respond to a particular user logging on. As further examples, the user may wish to respond to the amount of available volatile storage, to the occurrence of a particular DDL statement, to the occurrence of an error condition, or to the state of a queue of DML operations. With the conventional database management system, the customer can not define triggering events based on such states and operations beyond the scope of the table level.

One technique for customers to define actions that are performed upon the occurrence of such important situations involves polling the database by periodically sending requests from a database application to the database server that manages the database. In polling, the state of the database (as recorded, for example, in dynamic performance tables) is provided to the database application in response to a specific request for that information. The information thus provided to the database application may then be used by the database application to determine whether to issue certain commands to the database server.

With polling, the request is repeated at regular intervals of time dependent upon a polling frequency. If the polling frequency is very high, the polling will consume many system resources and interfere with the performance of the database being tracked. If the polling frequency is very low, important events may be discovered too late, or missed altogether. Thus polling can be expensive, unreliable, or both.

There is a need to reduce the consumption of system resources in applying triggers fired at the table level upon DML operations. There is also a need for users to respond to system states and operations beyond the scope of the table level, without resorting to polling.

SUMMARY OF THE INVENTION

Techniques are provided for database management using triggers of different scopes. According to one technique, data are received that indicate a selected scope for a trigger. The selected scope for the trigger is selected from several selectable scopes of database management. Each scope is associated with a set of one or more events. Data are also received that indicate a selected event that belongs to the set of one or more events. Trigger metadata for the trigger are stored, including data identifying the selected scope and the selected event.

In another aspect of the invention, a technique for executing a process in a database management system includes maintaining metadata about a particular scope. The particular scope is associated with a set of one or more events. The metadata about the particular scope includes one or more triggers associated with the particular scope. When the process causes a new event in the set of one or more events to occur, the technique checks flags that indicate which events in the set are associated with at least one trigger. If the flags indicate that the new event is associated with a trigger, then the trigger is fired.

In another aspect of the invention, a technique for executing a process in a database management system includes maintaining metadata about multiple scopes, each scope associated with a set of one or more events. A hierarchical relationship exists among the scopes. The metadata about the scopes includes a hierarchy indicating the hierarchical relationship. The technique also maintains metadata about each particular scope. The metadata about each particular scope includes the set of one or more events associated with the particular scope, one or more triggers associated with the particular scope, and flags that indicate which events in the set of one or more events associated with the particular scope are associated with at least one trigger. The process is associated with a first scope. The flags for the first scope are loaded into a private cache for the process. Also loaded into the private cache are the flags for a second scope. The second scope occurs at a higher level in the hierarchy than the level of the first scope.

In another aspect of the invention, a trigger map for a certain scope is stored on a computer-readable medium and used for database management. The trigger map includes flags that correspond to selectable events for the scope. A flag is "on" if a trigger is defined for that event at that scope.

In another aspect of the invention, a computer-readable medium bears information used for database management. This information includes a field indicating the number of triggers in a cache and at least one trigger specification area. The trigger specification area holds data which indicates one of several selectable events for firing the trigger.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

Techniques for providing database system event triggers are described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

FUNCTIONAL OVERVIEW

As mentioned above, in conventional database systems, triggers are associated with a table or view. That is, triggers have a table scope only. According to one aspect of the present invention, triggers are defined not only for events associated with tables and views, i.e., at the table scope, but also for events that occur at other scopes. Further, techniques are provided that allow users to define and use triggers that fire on events that include non-DML operations, such as: database startup and shutdown, a user logging onto and off the database, DDL operations, errors or exceptions generated during process execution, invocation of a stored procedure, database statistics achieving certain values, calls into a database server, and calls to an enterprise manager.

According to one embodiment, triggers that fire on non-DML operations are not handled in the same way as triggers defined for table level DML statements. For example, consider a trigger defined with a database scope when a user logs on to the database. This trigger is not associated with a particular table and must be fired before a user's SQL statement operation on a table is processed by being parsed and compiled. That is, the trigger cannot be fired at compile time like DML triggers. Thus, triggers not associated with DML operations on tables (non-DML events) are supported using techniques to load trigger maps, determine if the trigger is applicable, and load the conditions and actions of applicable triggers at run time, rather than at compile time. Those techniques shall be described in greater detail hereafter.

HARDWARE OVERVIEW

Figure 1:
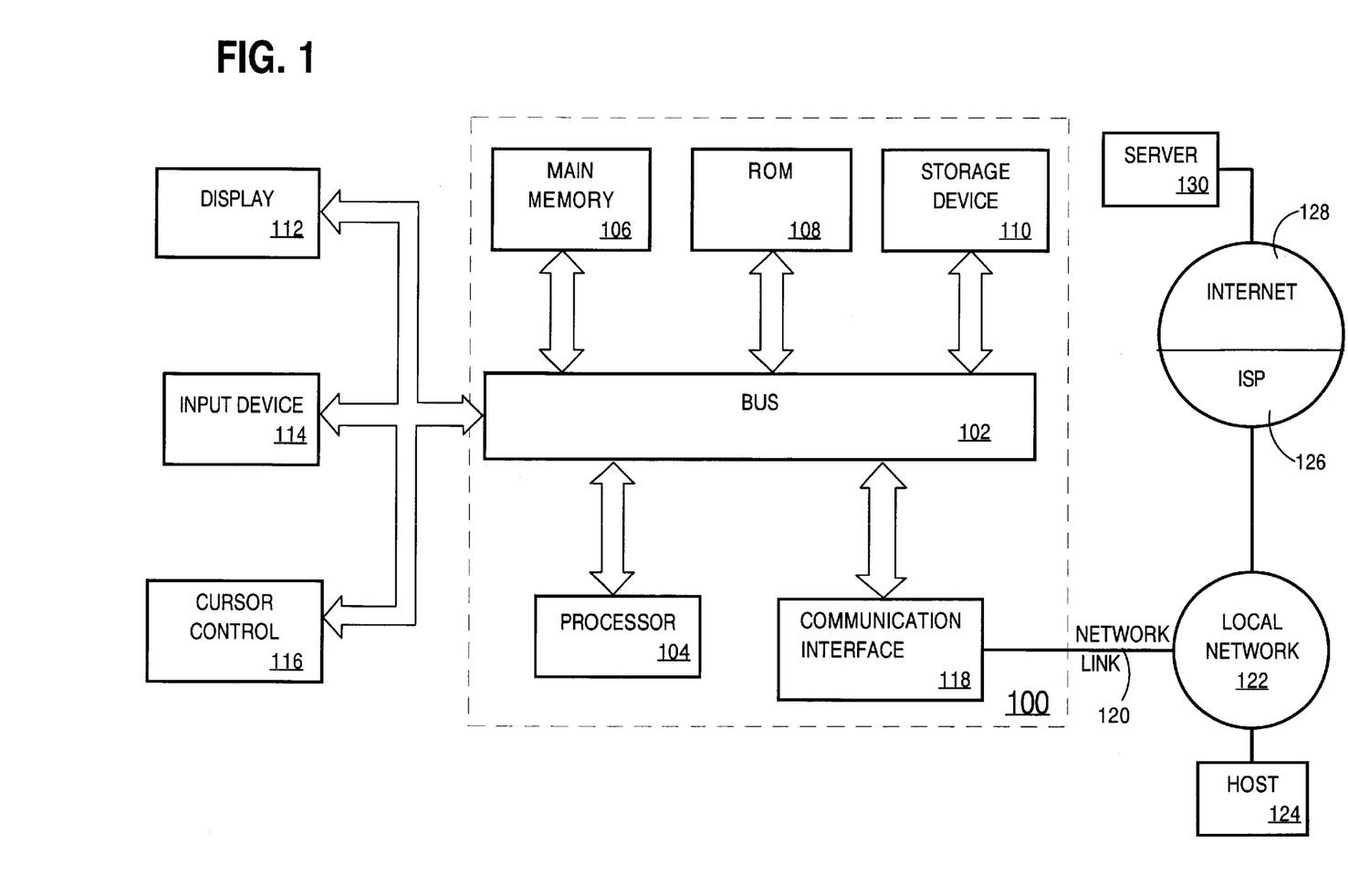
FIG. 1 is a block diagram of a computer system on which an embodiment of the invention may be implemented.

FIG. 1 is a block diagram that illustrates a computer system 100 upon which an embodiment of the invention may be implemented. Computer system 100 includes a bus 102 or other communication mechanism for communicating information, and a processor 104 coupled with bus 102 for processing information. Computer system 100 also includes a main memory 106, such as a random access memory (RAM) or other dynamic storage device, coupled to bus 102 for storing information and instructions to be executed by processor 104. Main memory 106 also may be used for storing temporary variables or other intermediate information during execution of instructions to be executed by processor 104. Computer system 100 further includes a read only memory (ROM) 108 or other static storage device coupled to bus 102 for storing static information and instructions for processor 104. A storage device 110, such as a magnetic disk or optical disk, is provided and coupled to bus 102 for storing information and instructions.

Computer system 100 may be coupled via bus 102 to a display 112, such as a cathode ray tube (CRT), for displaying information to a computer user. An input device 114, including alphanumeric and other keys, is coupled to bus 102 for communicating information and command selections to processor 104. Another type of user input device is cursor control 116, such as a mouse, a trackball, or cursor direction keys for communicating direction information and command selections to processor 104 and for controlling cursor movement on display 112. This input device typically has two degrees of freedom in two axes, a first axis (e.g., x) and a second axis (e.g., y), that allows the device to specify positions in a plane.

The invention is related to the use of computer system 100 for database system event triggers. According to one embodiment of the invention, triggers are identified and fired by computer system 100 in response to processor 104 executing one or more sequences of one or more instructions contained in main memory 106. Such instructions may be read into main memory 106 from another computer-readable medium, such as storage device 110. Execution of the sequences of instructions contained in main memory 106 causes processor 104 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 104 for execution. Such a medium may take many forms, including but not limited to, non-volatile media, volatile media, and transmission media. Non-volatile media includes, for example, optical or magnetic disks, such as storage device 110. Volatile media includes dynamic memory, such as main memory 106. Transmission media includes coaxial cables, copper wire and fiber optics, including the wires that comprise bus 102. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 104 for execution. For example, the instructions may initially be carried on a magnetic disk of a remote computer. The remote computer can load the instructions into its dynamic memory and send the instructions over a telephone line using a modem. A modem local to computer system 100 can receive the data on the telephone line and use an infra-red transmitter to convert the data to an infra-red signal. An infra-red detector can receive the data carried in the infra-red signal and appropriate circuitry can place the data on bus 102. Bus 102 carries the data to main memory 106, from which processor 104 retrieves and executes the instructions. The instructions received by main memory 106 may optionally be stored on storage device 110 either before or after execution by processor 104.

Computer system 100 also includes a communication interface 118 coupled to bus 102. Communication interface 118 provides a two-way data communication coupling to a network link 120 that is connected to a local network 122. For example, communication interface 118 may be an integrated services digital network (ISDN) card or a modem to provide a data communication connection to a corresponding type of telephone line. As another example, communication interface 118 may be a local area network (LAN) card to provide a data communication connection to a compatible LAN. Wireless links may also be implemented. In any such implementation, communication interface 118 sends and receives electrical, electromagnetic or optical signals that carry digital data streams representing various types of information.

Network link 120 typically provides data communication through one or more networks to other data devices. For example, network link 120 may provide a connection through local network 122 to a host computer 124 or to data equipment operated by an Internet Service Provider (ISP) 126. ISP 126 in turn provides data communication services through the world wide packet data communication network now commonly referred to as the "Internet" 128. Local network 122 and Internet 128 both use electrical, electromagnetic or optical signals that carry digital data streams. The signals through the various networks and the signals on network link 120 and through communication interface 118, which carry the digital data to and from computer system 100, are exemplary forms of carrier waves transporting the information.

Computer system 100 can send messages and receive data, including program code, through the network(s), network link 120 and communication interface 118. In the Internet example, a server 130 might transmit a requested code for an application program through Internet 128, ISP 126, local network 122 and communication interface 118. In accordance with the invention, one such downloaded application provides for triggers as described herein.

The received code may be executed by processor 104 as it is received, and/or stored in storage device 110, or other non-volatile storage for later execution. In this manner, computer system 100 may obtain application code in the form of a carrier wave.

MULTI-PROCESSING COMPUTER SYSTEMS

Multi-processing computer systems are systems that include multiple processing units that are able to execute instructions in parallel relative to each other. To take advantage of parallel processing capabilities, different aspects of a task may be assigned to different processing units. A multi-processing computer system may consist of one or more computers like the computer 100 and host 124 in data communication over one or more network links 120, and/or a single machine that has multiple processors.

Figure 2:
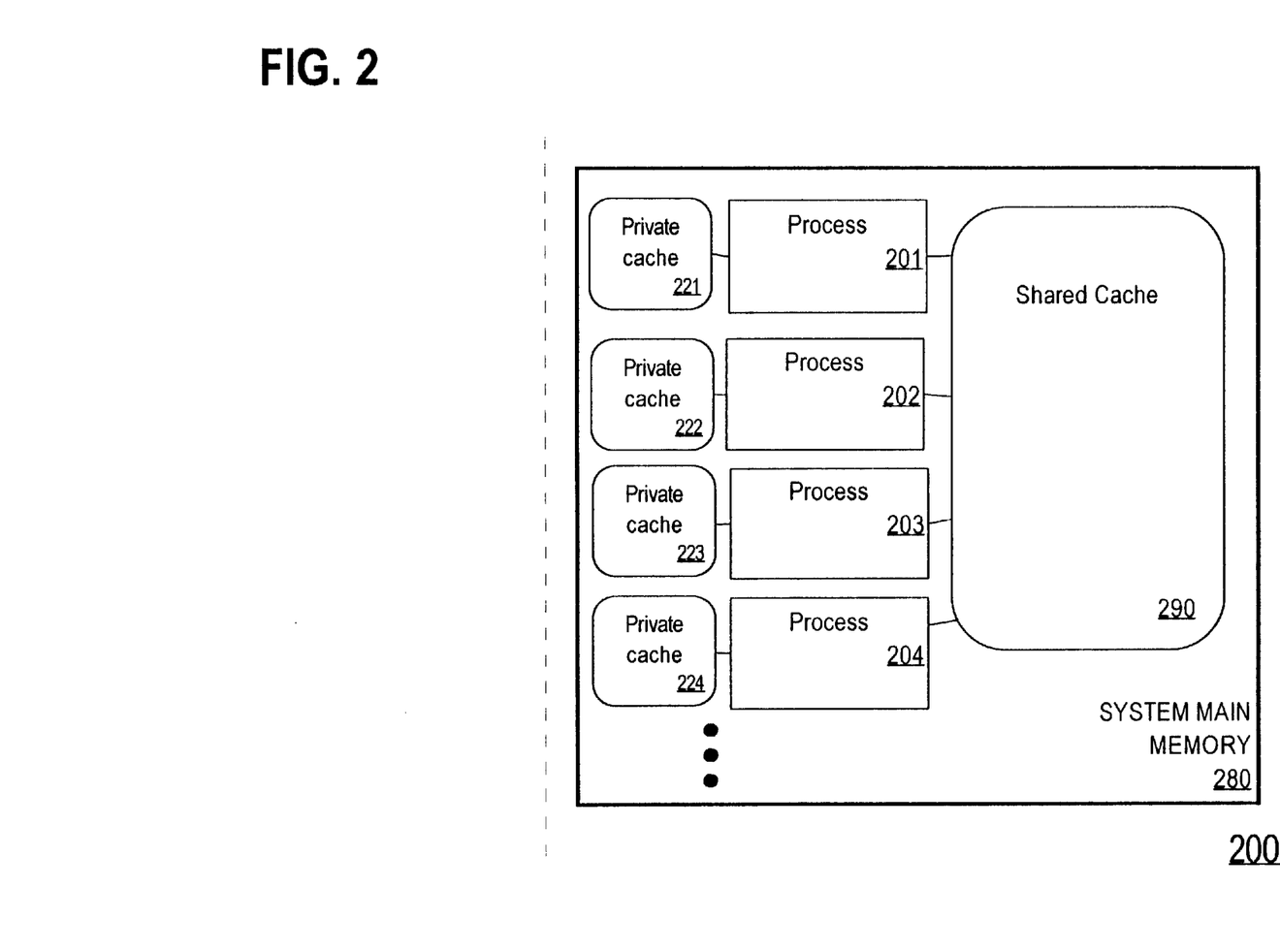
FIG. 2 is a block diagram of memory allocation on a computer system utilized by an embodiment of the present invention.

Multiprocessing systems typically shuttle data between the main memory available to the computer system and the various processors on the system. FIG. 2 represents multiple processes 201–204, etc., running on a multi-processing computer system 200 on which total available main memory 280 is apportioned to the processes 201–204, etc.

In many multiprocessing systems, a relatively small portion of volatile memory, called a private cache, is closely associated with a single process. For example, in FIG. 2, private caches 221–224 are associated with processes 201–204, respectively. Information stored in a given private cache is the most efficiently accessed information for the process associated with that private cache. For example, the information in private cache 221 is the most efficient information for the process 201 to use. Information shared by several processes, or less frequently used, or both, is typically stored in a shared cache 290 in volatile memory. Even less frequently used information is not maintained in volatile memory, but is only loaded into volatile memory on an "as needed" basis from slower, non-volatile memory devices like disks.

LOGICAL DATABASE STRUCTURES

A database typically includes one or more logical structures for arrangement of the data and processes to operate on those structures. For example, the logical structures of a typical relational database system include the database which comprises one or more related database objects arranged into one or more schemas. A schema is a collection of database objects that are available to a user. Schema objects include such structures as tables, views, stored procedures, and database links. Tables hold all of the user-accessible data arranged in rows and columns. A view is a custom presentation of the data in one or more tables. A stored procedure is a set of SQL and PL/SQL statements grouped together as an executable unit to perform a specific task. A database link describes a path from one database to another in a distributed database.

DATABASE MANAGEMENT PROCESSES

In general, a database management system includes one or more database servers that manage one or more databases. Each database server makes available a set of processes to provide the functions for database creation, maintenance and use, as needed. A database user uses tools provided with the database management system, or sends commands to the database server using an application programs consisting of one or more user processes, or both. Both the tools and the database applications call upon the database server processes. The database management system may also provide system level processes that operate on more than one database. Such system level processes include, for example an enterprise manager that provides a graphical user interface to illustrate the number and state of database instances running on a computer system.

As used herein, the term "process" refers to a mechanism that can execute a series of steps to complete a unit of activity. A process can be the result of a single SQL statement or a complex program written in a high level procedural programming language. The scope of a process refers to the largest database system structure on which the process operates. A typical database system includes processes that have a table scope, a schema scope, a database scope and a system scope.

METADATA

For the various processes to properly use the data in the database management system, information is needed about the structures in which the data are arranged, including information about the relationships between the structures. Such information is called metadata. Thus, information about the system is called system metadata, information about a database is called database metadata, information about a user is called user metadata, information about a table is called table metadata, and information about the columns is called column metadata. These sets of metadata are typically stored in association with the data in the database on non-volatile memory. The portion of the database that stores metadata about the database and its schema, tables and columns is frequently referred to as the "data dictionary" of the database.

SELECTABLE EVENTS

According to an embodiment of the present invention, when defining a trigger, the user is presented with controls that allow the user to select the event that will fire the trigger from a set of selectable events. In the preferred embodiment, the selectable events include non-DML operations.

The set of selectable events vary with the scope of a trigger. For example, for triggers having a database scope, the selectable events include STARTUP, SHUTDOWN, LOGON, LOGOFF, ERROR, CREATE, ALTER, DROP, INSERT, UPDATE, DELETE. For triggers having a schema scope, the selectable events include LOGON, LOGOFF, ERROR, CREATE, ALTER, DROP, INSERT, UPDATE, DELETE, but not STARTUP or SHUTDOWN.

For triggers having a system scope, the selectable events are CALL OPSYS, CALL OEM, STARTUP, SHUTDOWN, LOGON, LOGOFF, ERROR, CREATE, ALTER, DROP, INSERT, UPDATE, DELETE, where the first two events represent a call to the operating system, and a call to the Oracle Enterprise Manager, respectively, which are not in the database level selectable events.

For triggers having a row scope, the selectable events are ERROR, SELECT, INSERT, UPDATE, DELETE. Note that both DML and non DML operations are among the selectable events. Note that both table level operations and operations with other scopes are among the selectable events.

The specific scopes, and their corresponding list of selectable events, given above are merely exemplary. The actual set of selectable events for which triggers may be defined, and how those events are categorized into scopes, may vary from implementation to implementation. The present invention is not limited to any particular set of scopes or selectable events.

DEFINING A TRIGGER

Figure 3:
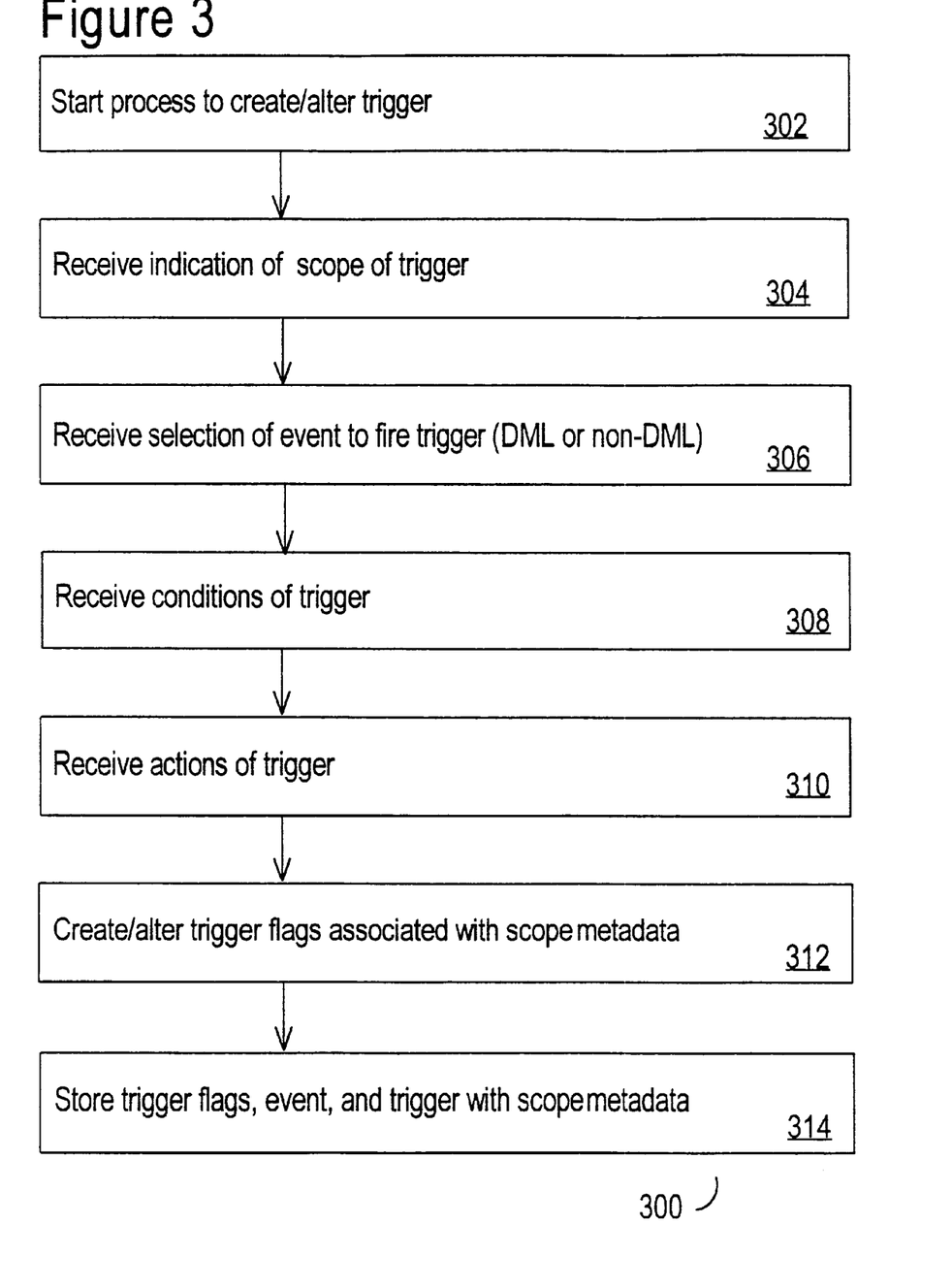
FIG. 3 is a flowchart for a method to create triggers of indicated scope according to one embodiment of the invention.

FIG. 3 is a flowchart depicting the method 300 that enables a user to define a trigger according to an embodiment of the present invention. The user starts a process, such as a database management tool, to create or alter a trigger, in step 302. The user is prompted to specify the scope of the trigger, such as system level, database level, schema level, table level or row level, in step 304. Significantly, step 304 is unnecessary in conventional trigger definition techniques because the scope of all triggers is always the table level.

In step 306, the user is then prompted to chose one of the selectable events for triggers at that level. The choice of selectable events in step 306 is much more extensive than in conventional database systems. In step 308, the user is prompted to provide the statements, such as SQL statements, that specify the conditions that must be satisfied before the trigger action is executed. In step 310, the user provides a procedure as an action to execute if the conditions of the trigger are satisfied.

In step 312, a trigger map associated with the scope is created or altered. In step 314, the trigger map of trigger flags for that scope is stored with the metadata for that scope, along with the conditions and actions. For example, in the preferred embodiment, the trigger map for the schema scope is stored in the data dictionary with the schema metadata. Trigger maps will be described in more detail below.

TRIGGER MAPS

Figure 4:
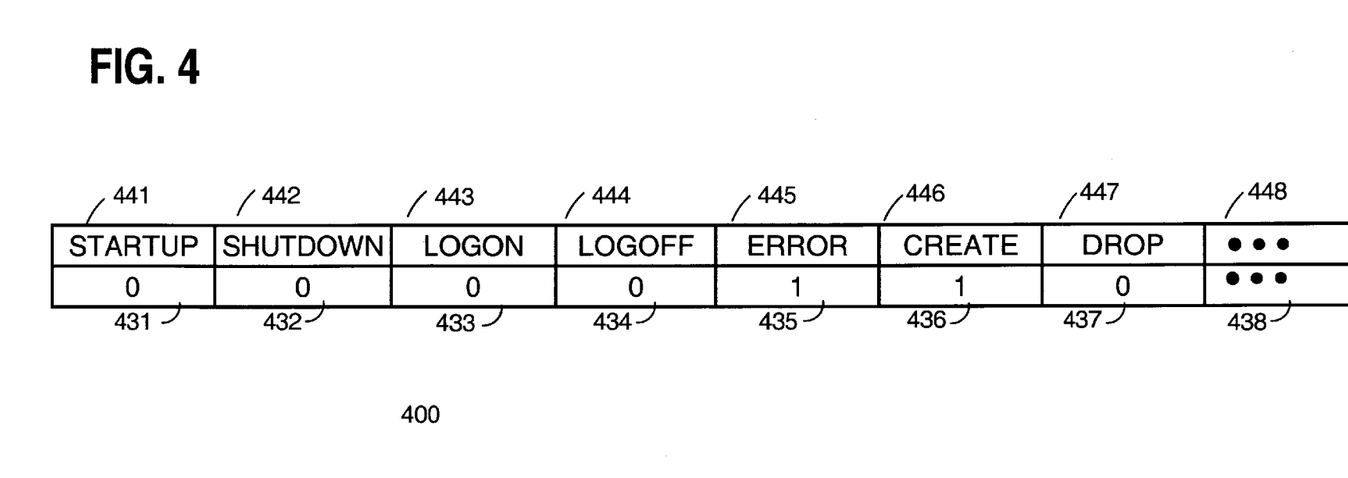
FIG. 4 is a block diagram of flags in a trigger map according to an embodiment of the invention.

In general, the trigger map for a given scope consists of a set of flags, each flag corresponding to one of the selectable events in that scope. The flag is set to "on" if that event has a trigger defined for that scope. FIG. 4 illustrates an example of trigger flags for a portion of a database scope trigger map. In this example, each flag 431–437, etc., is a binary bit with a "1" indicating that a trigger has been defined and a "0" indicating a trigger has not been defined. The position of the flag indicates the corresponding event, as shown by labels 441–447, etc. For example, the first flag 431 contains a "0" indicating the first event, STARTUP, label 341, does not have a trigger defined. The fifth flag 435 contains a "1" indicating the fifth event, ERROR, label 445, does have a trigger defined.

RUNTIME USE OF TRIGGER MAPS

Figure 5:
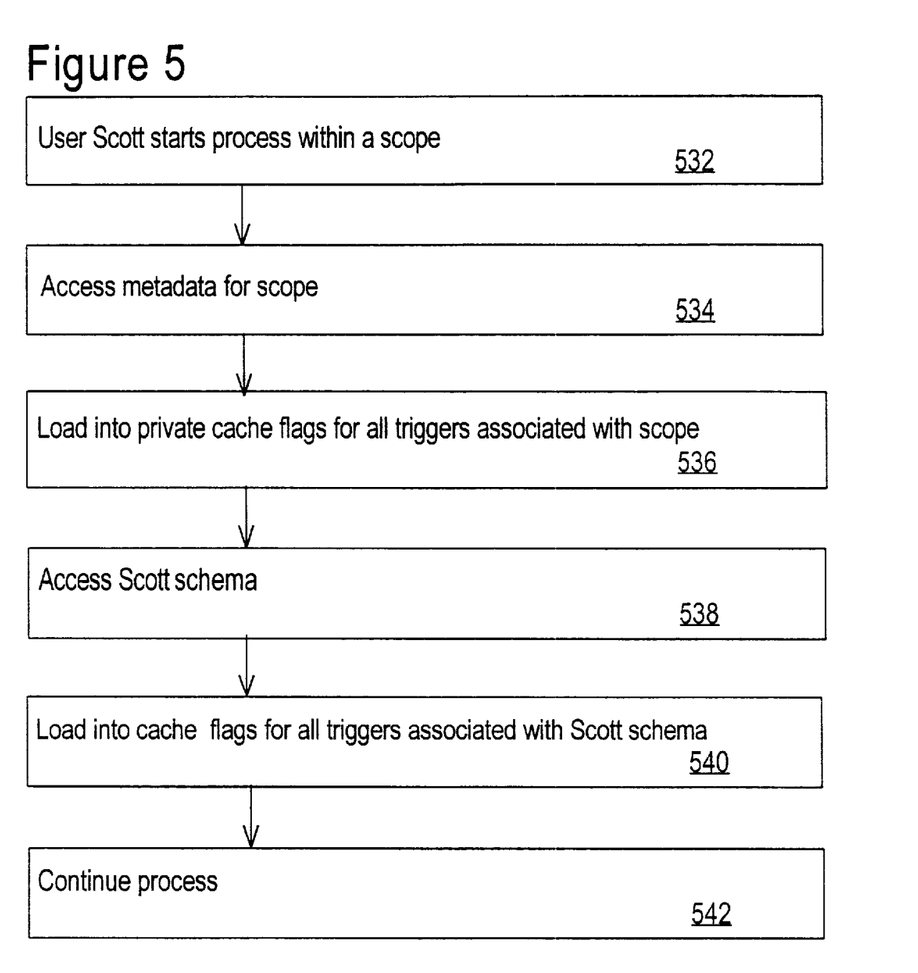
FIG. 5 is a flowchart for a first portion of a method to use triggers of indicated scope according to an embodiment of the invention.

FIG. 5 is a flowchart indicating how trigger maps are used when a database system process is executing at run time. The process is started by a user in step 532. In step 534, the process accesses the metadata for the scope of the process and in step 536 loads the trigger flags into the private cache for the process. For example, if the process 201 started by user Scott is a database level process for database FOO, then the process 201 accesses the data dictionary for the database FOO and loads the database FOO scope flags into its private cache 221. Since user Scott has initiated the process, the process is limited by the same privileges as would be Scott. The Scott schema defines the limits and privileges of the user Scott. Thus, in step 538 the process accesses the metadata for the scope of the Scott schema, and in step 540, the process loads the trigger flags for the Scott schema into the private cache for the process. The metadata for the Scott schema are stored in the data dictionary. The process continues in step 542. Note that only the flags are loaded into private cache, the trigger conditions and actions are not yet loaded from the metadata.

SCOPE HIERARCHY

In the above example, the trigger flags for two different scopes are loaded, the database scope and the schema scope. This is because, in this example, there is a hierarchical relationship between the scope of the schema and the scope of the database. In particular, each database contains one or more schemas, one schema for each user of the database.

In general, scopes may be related by a hierarchy. One example hierarchy typically found among database objects, is a multiple parent hierarchy, in which a child scope may have more than one parent scope. A scope without a parent is the top parent scope in the hierarchy. The parent also can have many children. Each succeeding generation of scopes from the top parent scope constitutes a different level of scopes in the hierarchy. A branch is a group of scopes in the hierarchy that can be connected from the lowest child in the group to the highest parent in the group by a single line traversing between each pair of levels.

In general, for scopes related by a hierarchy, the trigger flags are loaded for all scopes at and above the level of scope in which the process is acting. In one embodiment only flags for higher level scopes on the same branch need be loaded. In the above example, the process operates at the schema level for Scott. Thus, trigger flags are loaded for schema and database scopes. If a system scope were established, it would be the top parent scope, and its flags would also be loaded.

FIRING TRIGGERS

Figure 6:
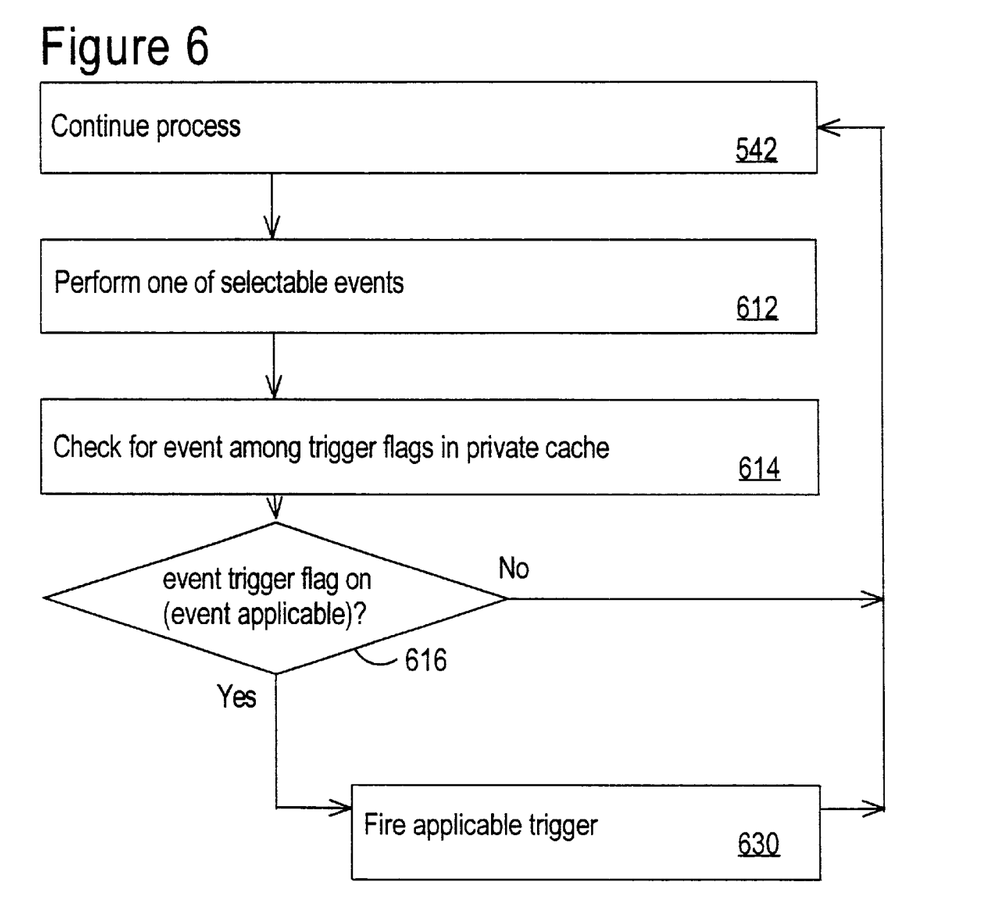
FIG. 6 is a flowchart for a second portion of a method to use triggers of indicated scope according to an embodiment of the invention.

FIG. 6 is a flow diagram which shows how the triggers are fired. At this point any process that is running, in step 542, has the trigger maps of one or more scopes residing in its private cache. For example, the trigger flags for the database FOO and the schema Scott are resident in the private cache 221 of the database FOO process 201. When any of the selectable events occurs during the process, as in step 612, the process checks the trigger maps in the private cache in step 614, to determine if the flag for this event is "on" in step 616. If the flag for this event is not "on," no trigger is defined for the event, and therefore the process continues normally at step 542 without firing a trigger.

It is important to note that, if the trigger is not fired, very little processing resources have been consumed. The limited number of defined events means the trigger map requires very few bits of storage. The location of the trigger map in private cache makes checks extremely efficient. In general, the trigger maps are loaded for all scopes of the process and larger scopes. This way a system scope set of triggers will be implemented by all processes on all databases on the system, as would be expected. Because the trigger maps are so small, this is not a heavy burden on the process or its private cache.

If the flag for this event is indeed on, a defined trigger is applicable, and the applicable trigger is fired at step 630. If control is returned to the process after the trigger is fired, the process continues in step 542.

EMPLOYING TRIGGER CONDITIONS AND ACTIONS

Figure 7:
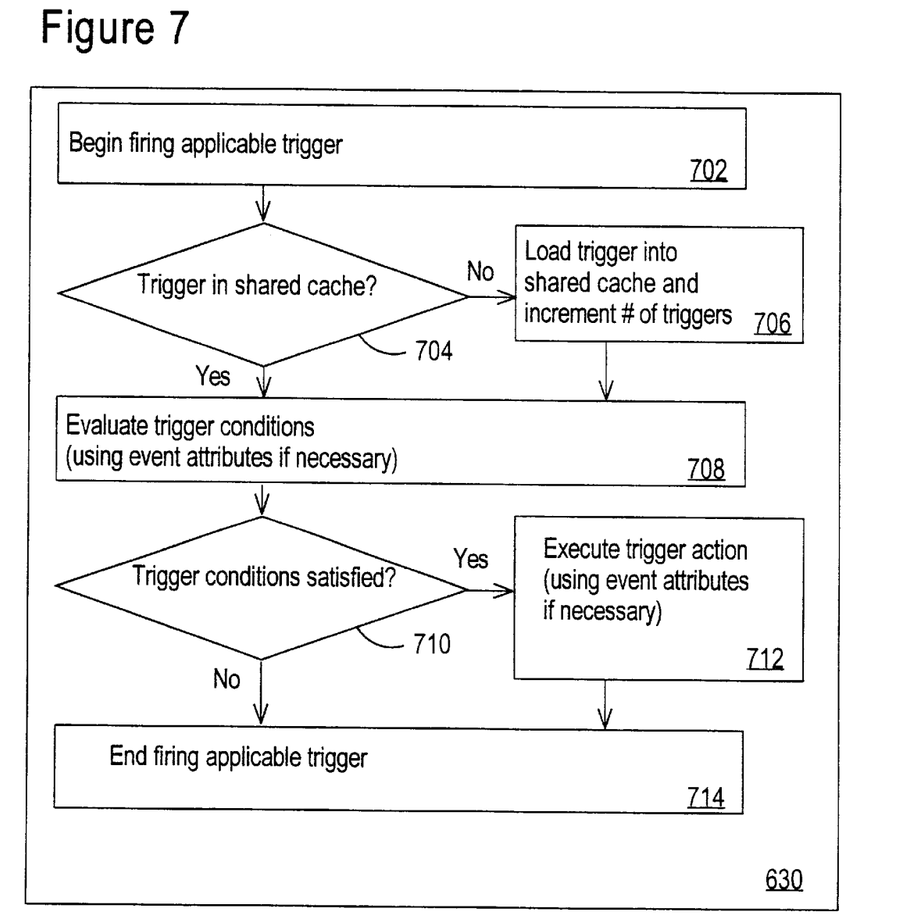
FIG. 7 is a flowchart for details of step 630 of FIG. 6, according to an embodiment of the invention.

FIG. 7 is a flow diagram showing details of firing the trigger in step 630. The trigger firing begins in step 702. In step 704, the firing mechanism checks to determine whether the applicable trigger is already in shared cache 290. If the trigger conditions and actions are not yet in shared cache 290, then, at least the trigger conditions are loaded into shared cache 290 from the metadata, and the number of triggers in shared cache is incremented in step 706. For example, if the applicable trigger's conditions and actions are not in the shared cache 290 already, the trigger's conditions and actions are loaded into the shared cache 290 from the data dictionary. In the preferred embodiment, the trigger is not loaded into shared cache until the first time a trigger is fired. This way, system resources are only consumed by the trigger conditions and actions if the trigger is fired. Consequently, hundreds of triggers may be defined without consuming substantial runtime system resources until absolutely necessary.

Figure 8:
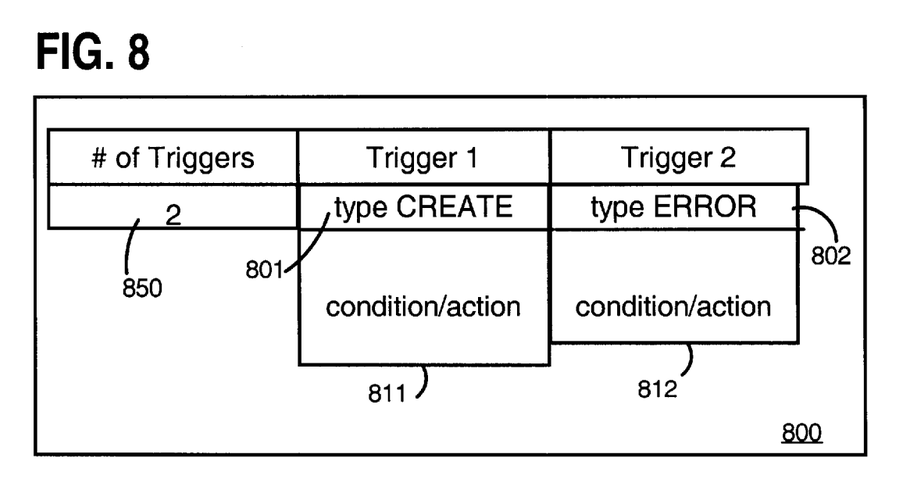
FIG. 8 is a block diagram of memory allocation in a shared cache for triggers of indicated scope according to an embodiment of the invention.

A sample structure for loading the trigger into shared cache 290 is illustrated in FIG. 8. For each trigger map of a given scope, a trigger specification area of memory 800 is set aside in the shared cache 290. This area stores the number 850 of triggers of that scope loaded into the shared cache 290. For each loaded trigger, the trigger type 801, 802 is stored, as is a region holding a block of code 811, 812 for the stored procedures of the conditions and actions.

For example, FIG. 8 shows that the number 850 of applicable triggers in shared cache 290 is "2." In this example, a CREATE statement was the first event to be executed by the process 201 with an "on" flag in its trigger map, such as shown in FIG. 4. Since the CREATE flag is on, the CREATE type trigger is applicable and the CREATE type trigger is fired. Thus, the CREATE type trigger is stored into shared cache 290 at region 801 and the conditions and actions are loaded into shared cache 290 at location 811 as the first trigger, "Trigger 1," of the database FOO scope process.

If several CREATE operations subsequently occur in process 201, no additional triggers need be loaded into shared cache. The needed type 801, and conditions and actions 811 are already there. In fact, if some other process with access to the same shared cache 290 (e.g. process 202) performs a CREATE operation on database FOO, that process also can find the necessary type 801 and conditions and actions 811 in the shared cache 290.

Similarly, in this example, an ERROR occurred during the process 201 before any other event whose flag is "on" in the trigger map shown in FIG. 4. Since the ERROR flag is "on," the ERROR type trigger was applicable and the ERROR type trigger was fired. Thus the ERROR type trigger is stored in shared cache at location 802 and the conditions and actions are loaded into shared cache at region 812 as the second trigger, "Trigger 2," of the database FOO scope process.

Referring again to FIG. 7, after the trigger conditions and actions are found in shared cache 290, the conditions are evaluated in step 708. When an event occurs, the event may have one or more attributes. For example, an error event has an error number as an attribute. Depending on the error number, the condition associated with the trigger may not be satisfied, and therefore the action associated with the trigger is not executed. As another example, an UPDATE event has as attributes the old values in each column of the row being updated and the new values in each column as a result of the update. Any of these attributes can be used in evaluating the conditions in step 708.

In step 710, it is determined whether the conditions of the trigger are satisfied. If the conditions of the trigger are not satisfied, the firing of the trigger ends in step 714. Processing control may be returned to the process which continues at step 542. If the conditions of the trigger are satisfied, the trigger actions are executed in step 712.

In another embodiment, further processing resources are conserved if the conditions and actions are separately loaded as needed. In this embodiment, when a trigger is fired and the trigger conditions and actions are not yet in shared cache 290, only the conditions are loaded into shared cache 290 at 811, 812 with the number of triggers 850 and the trigger type 801, 802. If the conditions are not satisfied in step 710, then the actions are not needed and are never loaded into shared cache 290. Only if the conditions are satisfied, in step 712 are the actions loaded into shared cache 290 at location 811, 812.

Further details on the operation and some additional advantages of the techniques described herein will be described next with the following examples.

EXAMPLE I

FASTER DML TRIGGERS AT SCHEMA-LEVEL SCOPE

Using one embodiment of the present invention, the large consumption of computational resources required for 1000 users to each set three triggers on a database table can be substantially reduced. As described in the background section for the conventional triggers, where 1000 users each set three triggers for a DELETE operation on a table, 3000 triggers were fired upon a DELETE operation to that table, and 3000 conditions had to be evaluated, each evaluation employing a 20,000 line procedure. Using the present invention, each DELETE event trigger can be defined for the schema, rather than for the table, and the table name can be used as a condition. Substantial computational resources can be saved, as explained below.

In this example, a schema scope trigger map is set up in the data dictionary for the schema of a user Scott. The selectable schema events in this example are LOGON, LOGOFF, ERROR, CREATE, ALTER, DROP, INSERT, UPDATE, DELETE in order, as in the embodiment described above. The Scott schema trigger map consists of the nine one bit flags "000000001" previously stored in the Scott schema in the data dictionary. When the user Scott logs onto the database, the Scott schema is employed, and when Scott starts process 201, the Scott schema trigger map is loaded from the Scott schema in the data dictionary into the private cache 221 of the process 201. When process 201 executes a DELETE operation, the Scott schema map in private cache 221 is checked, the DELETE flag is determined to be "on" and the DELETE Trigger is Applicable. The trigger is fired and the process 201 goes to shared cache 290 to find the DELETE type triggers in the Scott schema area. If none are there, the DELETE type triggers are loaded from the Scott schema in the data dictionary into the shared cache 290. In this example, three DELETE type triggers are found in the Scott schema portion of the data dictionary and loaded into the shared cache 290. Then the three conditions are evaluated and, if the conditions are satisfied, the actions are executed. If the DELETE type triggers are only intended for one particular table in the database, say an EMPLOYEE table, then the conditions include a test for the table name of the table being operated on by the delete operation. The table name is an event attribute of the DELETE event.

In this example, when Scott deletes a value from the table EMPLOYEE, only the three triggers defined by Scott are fired. The other 2997 triggers are not even fired, since they are defined for other schemas. Only three conditions then have to be evaluated using the 20,000 line procedure. Evaluating only three conditions, using the present techniques, rather than evaluating 3000 conditions, as in the conventional system, saves substantial computational resources.

EXAMPLE II

ONE TRIGGER GUARDS ALL OBJECTS OWNED BY A USER

In this example, when a user initiates a process, the schema scope trigger map loaded into private cache is not only the schema trigger map of the user, but also the schema level trigger map of the owner of the database object being acted upon. For example, when the user Scott initiates a process, the Scott schema trigger map is loaded into the private cache. Later, when the process attempts to perform an operation on the table EMPLOYEE, owned by Laurie, not only is the EMPLOYEE table trigger map, if any, loaded into private cache, but also the Laurie schema trigger map is loaded as well. In this way, Laurie can define one trigger that protects all her database objects. She need not copy those triggers into each table view and index that she owns.

SCHEMA LEVEL TRIGGER TYPES

According to an embodiment of the invention, a mechanism is provided that allows users to define two types of schema level triggers, where a different schema trigger map is used for each of the two types of schema level triggers. Specifically, a first set of schema level triggers may be defined for events that occur when the user associated with a selected schema initiates a process, and a second set of schema level triggers may be defined for events that occur when a database object owned by a selected schema is acted upon (by any user).

For example, Laurie can have two schema trigger maps (and associated triggers with conditions and actions). A first map corresponds to triggers for use by processes initiated by Laurie, and a second map corresponds to triggers for processes initiated by any users that act upon a database object owned by Laurie. Thus, in this embodiment, the "schema" scope is implemented as two separate and distinct scopes: one scope is a schema-actor scope the other scope is schema-owner scope.

EXAMPLE III

TRIGGERS BASED ON DATABASE STATISTICS

In this example, a user wants to fire a trigger when the event is that a particular database statistic has exceeded a threshold value. For example, a database administrator wants to send an electronic mail message (email) to the administrator's mailbox when shared memory use exceeds 75% of the amount allocated for a database, the number of bytes in the data files of the database exceed a particular size, or more than 25 users are logged on.

This kind of statistical information may be maintained by the database system, for example, in dynamic performance tables. Database administrators can query these tables, create views on these tables, and grant access to those views to others by creating public synonyms.

In one embodiment, a mechanism is provided that allows users to create triggers associated with operations relating to the statistical information maintained by the database system. Such triggers are referred to herein as "statistics" triggers. The scope of statistics triggers is referred to as the "statistics scope". A user may define a statistics trigger, for example, by selecting the scope of a trigger to be "statistics scope", and selecting the event for the trigger to be the UPDATE event. Such a trigger would fire when the database system updates the dynamic performance tables that store the database statistics. The attributes of the statistics scope UPDATE event include the synonym name of the view, and the new values of particular statistics provided by the view.

In another embodiment, the above statistics scope trigger is combined with a table scope UPDATE trigger on a one row table. In this embodiment, a statistics scope threshold trigger is fired on an UPDATE event for statistics views. The actions of the threshold trigger update the one row table only if a particular statistic exceeds a given threshold. Thus every time there is a UPDATE of a statistics view, the threshold trigger fires. When the value finally exceeds a given threshold, then the one row table is updated. The UPDATE trigger on the one row table then fires. In this way cascading triggers create the effect of a trigger firing upon a particular statistic exceeding a given threshold.

EXAMPLE IV

TRIGGERS FOR ROW-LEVEL SECURITY

For some applications it is useful to be able to limit access of a particular user to only given rows of a table. For example, a salesperson's access to a table of clients may be restricted to the clients of that particular salesperson. A particular user's access is controlled through views; that is, a user is given access to a view on the table, and the view is defined only for certain rows. However, each view requires database resources to define and maintain, and different views are needed in this example for each salesperson. It would be more efficient to control access to the data in the table on a row level. In this example, triggers are used to provide row-level access control, i.e., fine grained security.

Fine grained access control allows a database administrator to implement security policies with functions and then associate those functions with tables or views. The policy is implemented by adding a WHERE condition (a predicate) to the SQL statements received from a user. Additional details on the use of predicates to provide fine grained access are provided in the pending U.S. patent application Ser. No. 09/167,092, filed Oct. 5, 1998 "Database Fine-Grained Access Control" by Chon Hei Lei and Douglas James McMahon, hereby incorporated by reference in its entirety. Each database application can have its own application specific context. Predicates can be based on context values. For example, the WHERE condition can be one expression for a salesperson and a different expression for a staff member in human resources. Alternatively, the WHERE condition can depend on the salesperson's actual employee number. Users cannot arbitrarily change their context.

A database scope trigger on a LOGIN event can set the initial context for logged in users. For example, in the trigger action a user's employee number can be queried based on the user ID, and the returned value can be set as an "employee number" context value. Alternatively, the user's title can be queried, and the returned title, "salesperson," set as a "job title" context value.

OTHER EXAMPLES

Triggers defined using the techniques described herein can be used in many other ways as well, too numerous to list. Additional examples include the following.

Probes are used to report where different procedures are running and collect this information into memory. At logoff, this information is lost. A database scope trigger may be defined to write this information to printer or disk upon a LOGOFF event.

Cascaded triggers are used to catch an unauthorized person attempting to log on as a valid user. One database scope trigger is set for each ERROR with a condition that tests whether the error attribute indicates a login error. If so, a table indicating user name, location and time is updated. A second trigger fires on the updating of that table with the condition that the number of entries is greater than a threshold. The action of this second trigger is some remedial action, such as notifying a database administrator of the attempted unauthorized entry.

A database scope CREATE trigger can be used to generate extra columns on each table, such as used by Trusted Oracle to monitor who is changing tables.

A system scope STARTUP trigger can have as an action to send e-mail to a system administrator that any database has come on line or that a particular database has come on line.

Selectable events are defined for events about which a group of subscribers want notification. Triggers are then defined at the appropriate scope, where the trigger action is sending publication of the event to the subscribers.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for creating triggers, the method comprising:
receiving data that indicates a selected scope for a trigger, wherein the selected scope for the trigger is selected from a plurality of scopes of database management, wherein a first scope of the plurality of scopes consists of a single database object of a particular type and a second scope of the plurality of scopes includes a plurality of database objects of the particular type, and wherein each scope of said plurality of scopes is associated with a set of one or more events;
receiving data that indicates a selected event that belongs to the set of one or more events associated with the selected scope; and
storing trigger metadata for said trigger, said trigger metadata including data identifying the selected scope and the selected event.

2. The method of claim 1, wherein the selected event is an event that is not associated with a data manipulation language operation.

3. The method of claim 1, wherein:
the plurality of scopes includes a table scope and one or more other scopes; and
the selected scope is one of the one or more other scopes.

4. The method of claim 1, further comprising storing metadata about the selected scope, wherein the metadata about the selected scope includes flags that indicate which events in the set of one or more events associated with the selected scope are associated with at least one trigger.

5. The method of claim 4, further comprising:
starting a process within the selected scope;
loading the flags into a private cache of the process; and
checking the flags when a new event of the set of one or more events associated with the selected scope occurs in the process.

6. The method of claim 5, further comprising:
in response to checking the flags, firing the trigger if the new event is the selected event.

7. The method of claim 6, wherein the step of firing the trigger comprises the steps of:
determining whether applicable trigger condition is in a shared cache; and
if the applicable trigger condition is in the shared cache, then evaluating the applicable trigger condition; and
if the applicable trigger condition is not in the shared cache, then loading the applicable trigger condition from the metadata about the selected scope into the shared cache, and evaluating the applicable trigger condition.

8. The method of claim 2 wherein the selected event is a member of a group consisting of database startup, database shutdown, database server error, user logon, user logoff, create database object, alter database object and drop database object.

9. The method of claim 2 wherein the selected event is invocation of a stored procedure.

10. The method of claim 2 wherein the selected event is a call to a database server.

11. The method of claim 2 wherein the at least one non-DML event is a call to an enterprise manager.

12. The method of claim 1 wherein the trigger data is stored in a database managed by a database server and the selected event is a change in database statistics maintained by said database server.

13. A method for executing triggers in response to events caused by a process in a database management system, the method comprising:
maintaining metadata about a particular scope, wherein said particular scope determines which one or more database objects may be associated with a single trigger, and wherein said particular scope is associated with a set of one or more events, said metadata including one or more triggers associated with the particular scope;
when the process causes a new event in the set of one or more events associated with said particular scope to occur, checking flags that indicate which events in the set of events associated with said particular scope are associated with at least one trigger; and
if the flags indicate that the new event is associated with a trigger, then firing the trigger.

14. The method of claim 13, wherein:
the particular scope is one of a plurality of scopes of database management, wherein each scope of said plurality of scopes is associated with a set of one or more events; and
the method includes the step of maintaining metadata for each scope of said plurality of scopes.

15. The method of claim 13, further comprising the step of loading into a private cache of the process the flags that indicate which events in the set of events associated with said particular scope are associated with at least one trigger.

16. The method of claim 13, wherein the step of firing further comprises:
determining whether a condition of the trigger is in a shared cache;

if the condition is in the shared cache, then evaluating the condition; and if the condition of the trigger is not in the shared cache, then loading the condition from the metadata about the particular scope into the shared cache, and evaluating the condition.

17. The method of claim 13, wherein:

the new event has one or more event attributes;

the step of firing the trigger includes
providing a corresponding value for each of the one or more event attributes, and
evaluating a condition of the trigger in response to at least one corresponding value.

18. The method of claim 17, wherein:

the new event is an error event; and an error attribute is a type of error.

19. The method of claim 13, wherein:

the particular scope is a schema-actor scope associated with events performed by any process initiated by a certain user.

20. The method of claim 13, wherein:

the particular scope is a schema-owner scope associated with events performed on any database object owned by a certain user.

21. The method of claim 14, wherein:

a schema-actor scope of the plurality of scopes is associated with events performed by any process initiated by a certain user; and a schema-owner scope of the plurality of scopes is associated with events performed on any database object owned by the certain user associated with the schema.

22. The method of claim 14, wherein:

a statistics scope of the plurality of scopes is associated with events performed relating to the statistical information maintained by a database.

23. The method of claim 22, wherein:

the particular scope is the statistics scope;

the flags associated with the statistics scope indicate that an update event is associated with a threshold trigger; and the step of firing the trigger includes
evaluating a threshold trigger condition which is satisfied if a value of a certain statistic exceeds a set threshold, and
if the threshold trigger condition is satisfied, then updating a one row table.

24. The method of claim 23, wherein:

a one-row table scope of the plurality of scopes is associated with events performed relating to the one-row table;

the flags associated with the one-row table scope indicate that an update event is associated with a cascaded trigger; and the method further comprises performing an action associated with the cascaded trigger, if the value of the certain statistic exceeds the set threshold.

25. The method of claim 17, wherein:

the particular scope is a database scope associated with events performed relating to a certain database.

26. The method of claim 25, wherein:

the flags associated with the database scope indicate that a log on event is associated with a context trigger;

the new event is a logon event;

an event attribute is a user identification; and the step of firing the trigger includes executing a context trigger action which sets an initial context responsive to the user identification.

27. The method of claim 26, wherein:

access to a row in a table depends on the initial context.

28. A method for executing triggers in response to events caused by a process in a database management system, the method comprising:

maintaining metadata about a plurality of scopes, wherein each scope determines which one or more database objects may be associated with a single trigger, each scope associated with a set of one or more events, wherein a hierarchical relationship exists among the plurality of scopes, said metadata about the plurality of scopes including a hierarchy indicating the hierarchical relationship among the plurality of scopes;

maintaining metadata about each particular scope of the plurality of scopes, the metadata about each particular scope including the set of one or more events associated with the particular scope, one or more triggers associated with the particular scope, and flags that indicate which events in the set of one or more events associated with the particular scope are associated with at least one trigger;

associating the process with a first scope of the plurality of scopes;

loading into a private cache for the process the flags for the first scope; and loading into the private cache the flags for a second scope of the plurality of scopes, wherein the second scope occurs at a higher level in the hierarchy than a level in the hierarchy at which the first scope occurs.

29. The method of claim 28, wherein the first scope and the second scope form a branch.

30. The method of claim 28, wherein:

a schema-actor scope of the plurality of scopes is associated with events performed by any process initiated by a certain user; and a schema-owner scope of the plurality of scopes is associated with events performed on any database object owned by the certain user associated with the schema.

31. A computer-readable medium bearing instructions arranged to cause one or more processors to perform:

receiving data that indicates a selected scope for a trigger, wherein the selected scope for the trigger is selected from a plurality of scopes of database management, wherein a first scope of the plurality of scopes consists of a single database object of a particular type and a second scope of the plurality of scopes includes a plurality of database objects of the particular type, and wherein each scope of said plurality of scopes is associated with a set of one or more events;

receiving data that indicates a selected event that belongs to the set of one or more events associated with the selected scope; and storing trigger metadata for said trigger, said trigger metadata including data identifying the selected scope and the selected event.

32. The computer-readable medium of claim 31 bearing instructions to cause one or more processors to further perform storing metadata about the selected scope, wherein the metadata about the selected scope includes flags that indicate which events in the set of one or more events associated with the selected scope are associated with at least one trigger.

33. A computer-readable medium bearing instructions arranged to cause one or more processors to perform:

maintaining metadata about a particular scope, wherein said particular scope determines which one or more database objects may be associated with a single trigger, and wherein said particular scope is associated with a set of one or more events, said metadata including one or more triggers associated with the particular scope;

when the process causes a new event in the set of one or more events associated with said particular scope to occur, checking flags that indicate which events in the set of events associated with said particular scope are associated with at least one trigger; and if the flags indicate that the new event is associated with a trigger, then firing the trigger.

34. The computer-readable medium of claim 33 bearing instructions to cause one or more processors to further perform:

determining whether a condition of the trigger is in a shared cache;

if the condition is in the shared cache, then evaluating the condition; and if the condition of the trigger is not in the shared cache, then loading the condition from the metadata about the particular scope into the shared cache, and evaluating the condition.

35. A computer-readable medium bearing instructions arranged to cause one or more processors to perform:

maintaining metadata about a plurality of scopes, wherein each scope determines which one or more database objects may be associated with a single trigger, each scope associated with a set of one or more events, wherein a hierarchical relationship exists among the plurality of scopes, said metadata about the plurality of scopes including a hierarchy indicating the hierarchical relationship among the plurality of scopes;

maintaining metadata about each particular scope of the plurality of scopes, the metadata about each particular scope including the set of one or more events associated with the particular scope, one or more triggers associated with the particular scope, and flags that indicate which events in the set of one or more events associated with the particular scope are associated with at least one trigger;

associating the process with a first scope of the plurality of scopes;

loading into a private cache for the process the flags for the first scope; and loading into the private cache the flags for a second scope of the plurality of scopes, wherein the second scope occurs at a higher level in the hierarchy than a level in the hierarchy at which the first scope occurs.

36. A computer-readable medium bearing information for use by one or more processors that are executing one or more processes participating in database management on a certain scope, wherein the certain scope determines which one or more database objects may be associated with a single trigger, the information comprising a trigger map for the certain scope, the trigger map including a plurality of flags, each flag corresponding to a respective event of a plurality of selectable events for the certain scope, wherein a flag is on if a trigger is defined for the respective event.

37. A computer-readable medium bearing information for use by one or more processors executing one or more processes that are participating in database management on a certain scope, wherein the certain scope determines which one or more database objects may be associated with a single trigger, the information comprising:

a field indicating a number of triggers in a cache; and one or more trigger specification areas, each trigger specification area including data that indicates an event of a plurality of selectable events associated with the certain scope upon which event a trigger is fired.

38. The computer-readable medium of claim 37, wherein the trigger specification area further includes data that indicates conditions under which a trigger action is executed.

39. The computer-readable medium of claim 37, wherein the trigger specification area further includes data that indicates actions performed by the trigger if trigger conditions are satisfied.

40. A method for creating triggers, the method comprising:

receiving data that indicates a selected scope for a trigger;

wherein the selected scope for the trigger is selected from a plurality of scopes of database management;

wherein each scope of the plurality of scopes is associated with a set of one or more events;

wherein a first scope of the plurality of scopes is associated with a first set of events;

wherein a second scope of the plurality of scopes is associated with a second set of events;

wherein at least one event in said first set of events is not included in the second set of events;

receiving data that indicates a selected event that belongs to the set of one or more events associated with the selected scope; and storing trigger metadata for said trigger, said trigger metadata including data identifying the selected scope and the selected event.

* * * * *